(No Model.)
H. ZUCKWEILER.
TROLLING HOOK.
No. 463,240. Patented Nov. 17, 1891.
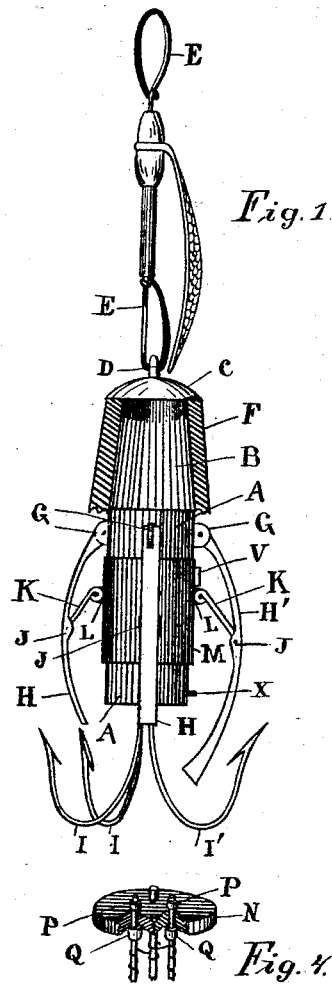
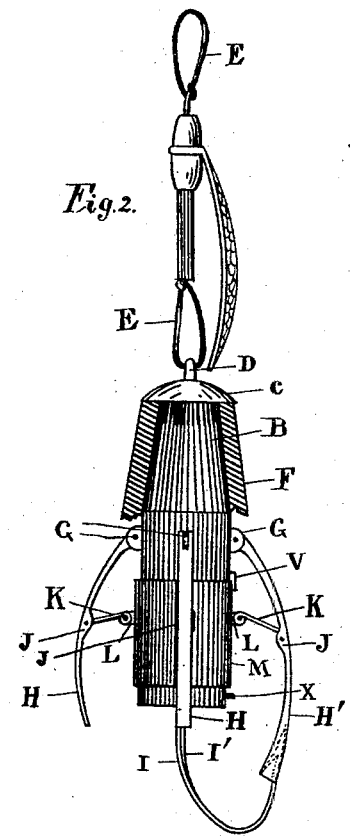
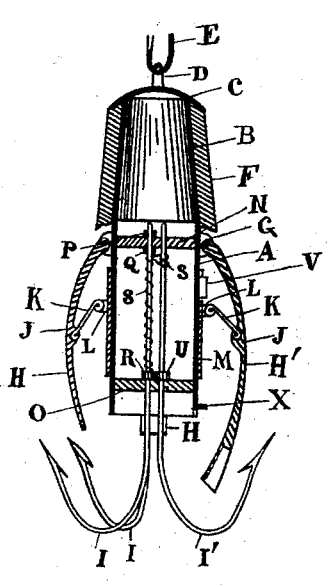
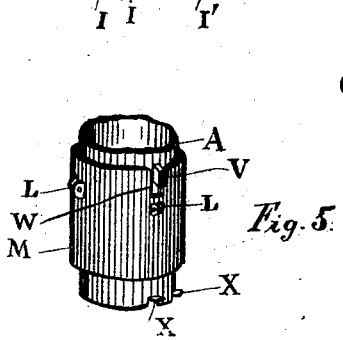
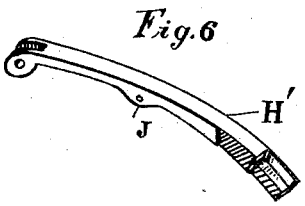
Witnesses:
E. J. Slough
A. Keithley
Inventor:
Henry Zuckweiler
By L. M. Thurlow

UNITED STATES PATENT OFFICE.

HENRY ZUCKWEILER, OF PEKIN, ILLINOIS.

TROLLING-HOOK.

SPECIFICATION forming part of Letters Patent No. 463,240, dated November 17, 1891.

Application filed April 6, 1891. Serial No. 387,828. (No model.)

*To all whom it may concern:*

Be it known that I, HENRY ZUCKWEILER, a citizen of the United States, residing at Pekin, in the county of Tazewell and State of Illinois, have invented certain new and useful Improvements in Trolling-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in trolling-hooks.

The object of the invention is to provide means whereby the hooks of the device may be sheathed or covered when drawn through the water, so that they may not catch on any obstruction, but said hooks may be uncovered by a fish suddenly striking a portion of the device in its attack upon it.

In the drawings hereto annexed, Figure 1 represents an elevation of the device, showing hooks open, as in the ordinary trolling-hook. Fig. 2 is also an elevation of the device, showing the hooks brought together and inclosed in a sheath or covering. Fig. 3 is a sectional elevation of the device with hooks open. Fig. 4 is a perspective view of the internal construction of the device and including hooks, and the whole removed from the body of the invention. Fig. 5 is a perspective view, on an enlarged scale, of part of the body of the invention and a slotted sliding sleeve surrounding the said body, and also showing several lugs, &c., for limiting the up-and-down movement of the said sleeve. Fig. 6 is a perspective view of an arm carrying a sheath or covering and detached from the body of the invention.

A represents a shell or tube of metal which constitutes the body of the invention and which is made of a sufficient length to perform its duty, and to the upper end of the shell or tube is soldered a cone B, and this cone is surmounted by a concave cap C, to the top of which is secured by proper means an eye D, through which is run the wire E for attaching to the line. The cap C overhangs the cone B, leaving a distance of about one-sixteenth of an inch all around the circumference of the said cone between the said cone and the edge of the cap C, and which space is filled by the feathers and composition F, commonly used in devices of this character. Just below the juncture of the tube A and cone B and attached to the said tube A are four ears, which are situated equidistant from each other around the periphery of the said tube. To each of three of these ears G is hung an arm H, of the form shown, and to the remaining ear is hung an arm H', which is much longer than the other three arms and the lower or free end of which is formed into a sheath or inclosure by an enlargement of the said end of the arm, and a hollow is cut in the said enlargement on the outer side and large enough to inclose and hold the points or barbs of all three of the hooks I I and I'. Each of the arms H mentioned are provided about midway of their length with an enlargement J, which carries a pin, as shown, and these pins are inclosed by an eye formed in a short strip or link of metal K, and the other end of this strip or link K is also formed into an eye, through which passes a pin in an eye L on the sliding sleeve M by the same means as above described—*i. e.*, by the eyes, links, &c.

The foregoing is descriptive of the outer construction of the device. The construction of the inner portion I shall proceed to describe.

In referring to Figs. 3 and 4, an upper plate N is seen, which is soldered or otherwise held in the interior of the tube or body A near the upper extremity of said tube or body, and a second plate O is also secured within the said body below the said plate N. Through these plates N and O pass the shanks of the three ordinary fish-hooks. These hooks are placed with reference to each other so as to form a triangle, as shown. The hooks I I are held in place by collars P P, which are soldered to the shanks of the hooks immediately above and resting upon the plate N, and also collars Q Q, which are soldered to the said shanks immediately below the plate N. This holds the hooks in place and at the same time allows the hooks to turn or swing, as will be hereinafter described. The hook I' is intended to be held rigidly in its place, and therefore it may be soldered to the plates N and O after being inserted therein. A spiral spring S is placed on each of the shanks of each of the two hooks I I, the upper ends of which are twisted around the shank of the fixed hook I' to give the said springs a hold. The lower extremities of the said springs are soldered to ears T T on each of the hooks I I. The ears T T are soldered to the collars R R, which in turn are soldered to the hooks and rest upon the upper surface of the lower plate O. To the fixed hook I' is also soldered a collar U, which also rests on the said plate O. The ears T T of the hooks I I are designed to press against the said collar U when the said hooks I I are in their normal position.

Fig. 5 shows a perspective view of part of the body or tube A, and also the sliding sleeve M. To the body A is soldered a lug V, as shown. A slot W is cut in the upper end of the sleeve M, and this slot allows the sleeve M to slip up and down on the body A without the said lug V interfering, except when the said sleeve M at the bottom of the slot W strikes against the said lug V, thus preventing the said sleeve M from going any higher than is necessary. At the lower extremity of the tube or body A two tongues X X are turned up from the metal of which the said body is made, thus forming a stop for the sleeve M in its downward movement.

In Fig. 6 will be seen more fully the arm H' with its sheath, as hereinbefore mentioned.

The operation of the device is as follows: When the device is to be used, the two movable or swinging hooks I I are taken in hand and turned partly around in opposite directions until they press against the fixed hook I', as shown in Fig. 2, and after this has been accomplished the long arm H' with its sheath is pulled outward until the said sheath incloses the barbs of all three of the hooks I I and I'. The device on being thrown into the water and drawn therethrough passes through all weeds, &c., growing under the water, and when one of the said arms H H is struck by a fish the sleeve M is at once raised by reason of the pressure of the said arm or arms. This draws the sheath inclosing the hooks inward, thus releasing the said hooks, after which the hooks I I are thrown back to their normal position by the springs S S, and the ears or wings T T strike on the collar U of the fixed hook I' and remain until all three hooks are replaced in the sheath. The lug V on the body A, and also the tongues X X on the lower end of body A, already referred to, are simply called into play in case the sleeve M should overreach the limits of its intended motion.

What I claim as new, and desire to secure by Letters Patent, is—

1. In a trolling-hook, the combination of the tube or body A, with the tapering portion B placed thereon and surmounted by the concave cap C, said body being also provided at its upper extremity, on the periphery thereof, with a series of one or more ears G, from each of which is hung an arm H and H', said arms being connected by a link to a sliding sleeve M, which surrounds the said body, and also of a series of hooks I and I', the one rigidly, the other movably, secured within the body A, the said hooks being held within the body by means of the plates N and O, the plate N being secured near the upper extremity of the interior of the body A, and the plate O being secured near the lower extremity of the interior of the said body, and the fixed hook I' being soldered or otherwise secured in said plate, and of a collar U, placed around said fixed hook and resting on the plate O, the swinging or movable hooks secured in said body by a collar P, rigidly secured to the upper extremity of said hooks and resting on the plate N, a collar Q, also rigidly secured to the said hooks and under the said plate N, and of a spiral spring placed on the swinging hooks for actuating said hooks, the lower extremities of said spring pressing against a wing or ear on each of said hooks, for the purposes herein set forth and described.

2. In a trolling-hook, the tube or body A, with the tapering portion B placed thereon and surmounted by the concave cap C, said body being also provided at its upper extremity, on the periphery thereof, with a series of one or more ears G, from each of which is hung an arm H and H', the arm H' being longer than arm H and its lower extremity being provided with a cavity, the said arms being connected by a link to a sliding sleeve which surrounds the said body A, in combination with the series of hooks I and I', held within the body, of the collars P and Q, placed thereon on either side of an upper plate N, and a collar R, and a wing or ear T on the said hooks I, of the fixed hook I', rigidly secured to the said plate N, and of the collar U on said hook I' and plate O, and of the spiral springs S S, placed over the said hooks I, as set forth and described.

3. In a trolling-hook, the combination of the body A and the internal mechanism composed of the fixed hook I', the swinging or movable hooks I, the collar U, placed on the said hook I', the collars P and Q, secured to the upper extremity of the swinging hooks I, of the spiral springs S S, the collars R, with their wings or ears T, and the plates N and O, and all working in the manner and for the purposes set forth and described.

4. In a trolling-hook, the body A, provided near its upper extremity with a series of one or more eyes G, the arms H and H', pivoted to said eyes, and the links K, connecting the said arms H and H' with the sleeve M, in combination with the series of hooks I and I', secured with the body A, and all working together in the manner and for the purposes set forth and described.

In testimony whereof I affix my signature in presence of two witnesses.

HENRY ZUCKWEILER.

Witnesses:
GEORGE C. RIDER,
WILLIAM B. AYDELOTT.